US008091079B2

(12) United States Patent
Archambault et al.

(10) Patent No.: US 8,091,079 B2
(45) Date of Patent: Jan. 3, 2012

(54) IMPLEMENTING SHADOW VERSIONING TO IMPROVE DATA DEPENDENCE ANALYSIS FOR INSTRUCTION SCHEDULING

(75) Inventors: Roch G. Archambault, North York (CA); Yaoqing Gao, North York (CA); Raul E. Silvera, Woodbridge (CA); Peng Zhao, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 11/846,910

(22) Filed: Aug. 29, 2007

(65) Prior Publication Data

US 2009/0064121 A1  Mar. 5, 2009

(51) Int. Cl.
*G06F 9/45* (2006.01)
*G06F 9/44* (2006.01)
(52) U.S. Cl. .................. 717/161; 717/140; 717/170
(58) Field of Classification Search .......... 717/140–149, 717/161, 170–172; 709/203–204
See application file for complete search history.

(56) References Cited

U.S. PATENT DOCUMENTS

| | | | | |
|---|---|---|---|---|
| 5,274,818 A | * | 12/1993 | Vasilevsky et al. | 717/149 |
| 5,293,631 A | * | 3/1994 | Rau et al. | 717/154 |
| 5,524,244 A | * | 6/1996 | Robinson et al. | 717/140 |
| 5,535,393 A | * | 7/1996 | Reeve et al. | 717/149 |
| 5,551,039 A | * | 8/1996 | Weinberg et al. | 717/150 |
| 5,650,948 A | * | 7/1997 | Gafter | 716/103 |
| 5,666,296 A | * | 9/1997 | Gafter | 716/103 |
| 5,701,488 A | * | 12/1997 | Mulchandani et al. | 717/128 |
| 5,920,716 A | * | 7/1999 | Johnson et al. | 717/141 |
| 6,045,585 A | * | 4/2000 | Blainey | 717/156 |
| 6,247,173 B1 | | 6/2001 | Subrahmanyam | |
| 6,507,947 B1 | * | 1/2003 | Schreiber et al. | 717/160 |
| 6,550,059 B1 | * | 4/2003 | Choe et al. | 717/159 |
| 6,751,792 B1 | * | 6/2004 | Nair | 717/161 |
| 6,996,817 B2 | * | 2/2006 | Birum et al. | 717/170 |
| 7,000,213 B2 | * | 2/2006 | Banerjee et al. | 716/103 |
| 7,191,433 B2 | * | 3/2007 | Narad et al. | 717/140 |
| 7,302,679 B2 | * | 11/2007 | Chakrabarti et al. | 717/144 |
| 7,426,721 B1 | * | 9/2008 | Saulpaugh et al. | 717/144 |
| 7,516,441 B2 | * | 4/2009 | Hamilton et al. | 717/110 |
| 7,631,305 B2 | * | 12/2009 | Rong et al. | 717/161 |
| 7,784,046 B2 | * | 8/2010 | Lajolo et al. | 717/172 |

OTHER PUBLICATIONS

Ambriola et al, "The evolution of configuration management and version control", IEEE SE Journal, pp. 303-310, 1990.*
Lukac et al, "Generalized selection weighted vector filters", Jour. of Applied Signal Process. pp. 1870-1885, 2004.*
Nguyen, "Component based version management for embadded computing system design", ACM SAC, pp. 685-692, 2007.*
Kaur et al, "Version management and composition of software comonents in different phases of software development life cycle", ACM SIGSOFT, vol. 34, No. 4, pp. 1-9, 2009.*

(Continued)

*Primary Examiner* — Anil Khatri
(74) *Attorney, Agent, or Firm* — Cantor Colburn LLP; Libby Toub

(57) ABSTRACT

A method for implementing shadow versioning to improve data dependence analysis for instruction scheduling in compiling code, and to identify loops within the code to be compiled, for each loop initializing a dependence a matrix, for each loop shadow identifying symbols that are accessed by the loop, examining dependencies, storing, comparing and classifying the dependence vectors, generating new shadow symbols, replacing the old shadow symbols with the new shadow symbols, generating alias relationships between the newly created shadow symbols, scheduling instructions and compiling the code.

5 Claims, 3 Drawing Sheets

OTHER PUBLICATIONS

Pugh et al., "Constraint-Based Array Dependence Analysis", ACM Transactions on Programming Languages and Systems, v 20, n 3, May 1998.

Fahringer et al., "Symbolic Evaluation for Parallelizing Compilers", Proceedings of the 11th ACM International Conference on Supercomputing, Vienna, Austria, Jul. 1997.

* cited by examiner

Auxiliary functions:
*DependenceExists(i, j):* queries *data dependence information* between the $i^{th}$ and $j^{th}$ access available in the frontend. Returns TRUE is there is dependence. Otherwise, returns FALSE.
*Equal(p, q):* element-wise compares *p* and *q*, two rows in *dependence_matrix*. Return TRUE if all the corresponding elements in the two vectors are the same. Otherwise returns FALSE.
*CreateNewShadowSymbol:* generates a new shadow symbol in the program
*ReplaceWithNewShadow(symbol)* : goes through the program to replace related accesses with the new shadow *shadow*
*SetAlias(symbol1, symbol2):* sets symbol1 and symbol2 aliased with each other
*SetNoAlias(symbol1, symbol2):* Set symbol1 and symbol2 not aliased

```
ShadowVersioning {
    For each loop L {
        For each shadow symbol S accessed in loop L {
            For i from 1 to N {                        // step 1
                dependence_matrix[i][i] = dependence; merged[i] = FALSE;
                For j from i+1 to N {
                    if (DependenceExists(i, j))
                        dependence_matrix[j][i] = dependence_matrix [i][j]
= no_dependence;
                    else
                        dependence_matrix [j][i] = dependence_matrix [i][j]
= dependence;
                }
            } // end of step 1
            GroupNum=0;
            For i from 1 to N {                        // step2
                if (merged[j]) continue;
                GroupNum++; counter=0; // counter counts the accesses in a set
                newshadows[GroupNum] = CreateNewShadowSymbol();
                ReplaceWithNewShadow(newshadows[i]);
                For j from i+1 to N {
                    if (merged[j]) continue;
                    if ( equal (dependence_matrix [i], dependence_matrix [j]))
{
                        set[GroupNum] [counter++] = j ; merged[j] =
TRUE;
                    }
                }
            } // end of step2
            For i from 1 to GroupNum {                 // step3
                For j from i+1 to GroupNum {
                    If (DependenceExists(set[j][0], set[j][0]))
                        SetAlias(newshadows[i], newshadows[j]);
                    else
                        SetNoAlias (newshadows[i], newshadows[j]);
                }
            } // end of step 3
        } // For each shadow symbol S accessed in the loop
    } // for each loop L
}
```

Fig. 2 ↖200

IMPLEMENTING SHADOW VERSIONING TO IMPROVE DATA DEPENDENCE ANALYSIS FOR INSTRUCTION SCHEDULING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to compilers and instruction scheduling, and particularly to for implementing shadow versioning to improve data dependence analysis for instruction scheduling.

2. Description of Background

In a program, when an instruction writes to a piece of data that is also accessed by another instruction, we say there is data dependence between the two instructions or the two data accesses. Data dependence must be carefully preserved in compiler optimizations to maintain correct program semantics. The quality of data dependence information has big impacts on compiler optimizations because data dependence information is needed in many optimizations, especially in instruction scheduling. In the following code snippet, it appears that array A is accessed twice in the loop body.

```
Line 1: int A[2000], i;
Line 2: for (i=0; i<1000; i++) {
Line 3:    A[i] = i;
Line 4:    A[i+1000] = 3*i;
Line 5: }
```

Lines 3 and line 4 must be executed sequentially because the same piece of data (array A) is accessed one after the other. However, the two accesses to the array A don't overlap in each iteration. If a compiler figures out this fine-grained data dependence relationship, it could schedule the instructions at line 3 and line 4 to be executed in parallel, improving runtime performance.

A shadow symbol represents a set of memory locations that are accessed by certain pointer dereferences or array indexing. Without sophisticated analysis, a compiler must conservatively assume that two accesses to the same shadow symbol refer to the same memory location.

Compilers have abundant supporting information to get better dependence information in the high-level optimizer. Unfortunately, the information collected in high-level optimizations is difficult to be transferred to instruction scheduling because code keeps changing during compilation and the task of bookkeeping the data dependence information during compilation is very complex, if not impossible.

What is needed is a way to take advantage of the analysis results in high-level optimizations of a compiler to get better data dependence information for shadows in the low-level optimizer.

SUMMARY OF THE INVENTION

Exemplary embodiments include a method for implementing shadow versioning to improve data dependence analysis for instruction scheduling in compiling code, the method including in a processor, identifying a plurality of loops within the code, for each loop of the plurality of loops identify an original shadow symbol accessed in the loop, for each original shadow symbol accessed in the loop, performing initializing a dependence matrix having N rows and N columns for N accesses to the original shadow symbol in the loop, wherein an $i^{th}$ row vector represents the dependence relationship between the $i^{th}$ access to the shadow symbol and all the accesses to the same shadow in the loop, examining dependencies between an access pair X, Y to the original shadow symbol, storing dependence vectors for a given access in the dependence matrix as N row vectors wherein the dependence matrix has two possible values, no-dependence and dependence, and wherein all diagonal matrix elements have the dependence value, and wherein each N row vectors is a dependence vector for access,comparing the dependence vectors, classifying the dependence vectors into an X-set and a Y-set based on the access pairs X, Y, wherein accesses in a common set includes common dependence vectors, generating a new shadow symbol for each set, replacing the original shadow symbol with the new shadow symbol for a corresponding access in the code, by examining dependencies of the corresponding access in the code, wherein the corresponding access is an element of an NxN dependence matrix and replacing the original shadow symbol with the new shadow symbol that shares a common dependency vector from the dependence matrix, generating alias relationships between the newly created shadow symbols, performing instruction scheduling for the code and compiling the code.

Further exemplary embodiments include a system for implementing shadow versioning to improve data dependence analysis for instruction scheduling in compiling code, the system including a processor coupled to a memory, a compiler residing in the memory having instructions for identifying a plurality of loops within the code, for each loop of the plurality of loops identify an original shadow symbol accessed in the loop, for each original shadow symbol accessed in the loop, performing initializing a dependence matrix having N rows and N columns for N accesses to the original shadow symbol in the loop, wherein an $i^{th}$ row vector represents the dependence relationship between the $i^{th}$ access to the shadow symbol and all the accesses to the same shadow in the loop, examining dependencies between an access pair X, Y to the original shadow symbol, assigning a no-dependence value to a dependence vector having an absence of a dependence between the access pairs X, Y, assigning a dependence value to a dependence vector having a dependence between the access pairs X, Y, storing dependence vectors for a given access in the dependence matrix as N row vectors, wherein the dependence matrix has two possible values, no-dependence and dependence, and wherein all diagonal matrix elements have the dependence value, and wherein each N row vectors is a dependence vector for access, comparing the dependence vectors, classifying the dependence vectors into an X-set and a Y-set based on the access pairs X, Y, wherein accesses in a common set includes common dependence vectors, generating a new shadow symbol for each set, replacing the original shadow symbol with the new shadow symbol for a corresponding access in the code, by examining dependencies of the corresponding access in the code, wherein the corresponding access is an element of an NxN dependence matrix and replacing the original shadow symbol with the new shadow symbol that shares a common dependency vector from the dependence matrix, aliasing two new shadow symbols based on an original dependence of corresponding original symbols in the X-set and the Y-set, wherein a pair of newly created shadow symbols do not alias each other in response to an absence of a dependence relationship between original symbols in the X-set and the Y-set and marking the pair of newly created shadow symbols having the absence of the dependence relationship between original symbols in the X-set and the Y-set, as not aliased, recovering the dependence information to check the alias relationship between the new shadow symbols, reordering a set of instructions associated with the new shadow symbols marked as not-aliased, performing instruction scheduling for the code; and compiling the code.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which implements shadow versioning to improve data dependence analysis for instruction scheduling.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 illustrates pseudo-code of the process of shadow versioning in accordance with exemplary embodiments.

Figure 1:
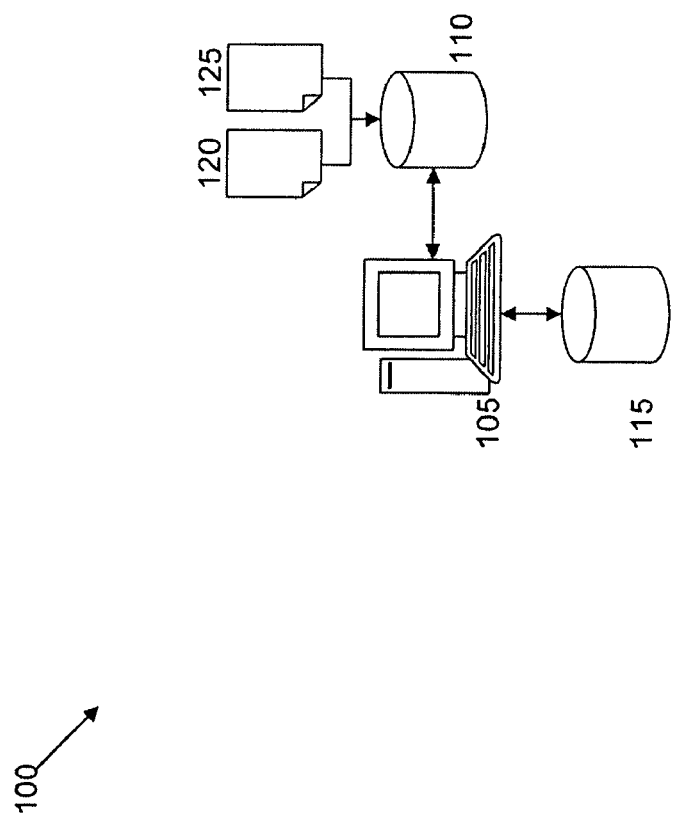
FIG. 1 illustrates an exemplary system for implementing shadow versioning to improve data dependence analysis for instruction scheduling.

The detailed description explains the preferred embodiments of the invention, together with advantages and features, by way of example with reference to the drawings.

DETAILED DESCRIPTION OF THE INVENTION

Exemplary embodiments include systems and methods for implementing shadow versioning to improve data dependence analysis for instruction scheduling. In exemplary embodiments, optimization occurs at the end of the high-level optimizer optimizations in a compiler. Since loops usually contribute most of the run time, the systems and methods described here take a loop body as the working unit. On each loop body, the systems and methods described herein check a group of accesses that refer to the same shadow symbol. These accesses are classified according to their dependency status to the other accesses in the group. In exemplary embodiments, the systems and methods described herein encode the highly refined data dependence information available in high-level optimizer optimizations in symbol names and alias information so that the instruction scheduler could easily recover data dependence information. For data accesses that refer to the same shadow in a loop, the systems and methods described herein generate different symbols and mark them as not aliased with each other when it is determined that there is no dependence between these data accesses. Because the original shadow symbol is renamed to different symbols, the low-level optimizer does not automatically regard them as the same piece of data. The low-level optimizer checks the alias relationships between these shadows. If they are marked as not aliased, the low-level optimizer knows they never overlap and it is safe to reorder the involved instructions. In exemplary embodiments, some extra space is used for symbols and alias information to convey the highly refined data dependence information from the high-level optimizer to the low-level optimizer. In this way, the low-level optimizer performs efficiently for shadow-involved code at an acceptable compilation time cost.

In exemplary embodiments, the problem of reducing dependence calculation overhead is approached from the perspective of introducing new symbols to represent the set of memory accesses that have dependencies. This symbol carries alias information that relates or differentiates itself with other symbols, saving dependence analysis overhead in the low-level optimizer.

Conventionally, for data dependence analysis for two scalar data accesses, the compiler only needs to check whether they refer to the same scalar or not. If they access the same scalar, there is dependence between them. Otherwise, there is no dependence. If shadows (i.e. non-scalar data access, including pointer dereferences and array element accesses) are involved, data dependence analysis is more involved. First, non-scalar symbols might alias with other symbols. Therefore, unlike for two scalar symbols, a compiler must be conservative if non-scalar symbols are involved. If the compiler knows that the two different symbols in considerations don't alias with each other, it is safe to say that there is no data dependence. Otherwise, the compiler must be conservative and assume that there is dependence. Second, compliers often denote all the elements in an array or all dereferences to the same pointer variable by a single symbol because it has limited resources to represent so many data objects. Although a pointer value or an array index could change, the compiler always sees all array elements or pointer dereferences as an atomic data if without further aggressive analysis on alias, array data flow, etc.

Modern compilers often perform high-level optimizations (such as inter-procedural analysis, SSA-based data flow analysis and high-level loop analysis) before low-level optimizations (such as instruction scheduling and code generation). Performing intensive data dependence analysis is much more difficult in instruction scheduling than in early, high-level optimizations. High-level optimizations go through the entire program to collect information so that it optimizes applications in a whole-program way. Therefore, the compiler has a lot of supporting information to do a good job in data dependence analysis. But the condition for low-level optimizations is very different. The context that the low-level optimizer can see is very limited: oftentimes it performs analysis and transformations on basic block level and doesn't have so much information as the high-level optimizer does. Often, the low-level optimizer doesn't perform the sophisticated analysis to support its data dependency check. Therefore, collecting good data dependence information in compiler low-level optimizer is always a challenging task for all the compilers.

FIG. 1 illustrates an exemplary system 100 for implementing shadow versioning to improve data dependence analysis for instruction scheduling. In exemplary embodiments, the system 100 includes a processing device 105 such as a computer, which includes a storage medium or memory 110. The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processing device 105.

A data repository 115 is coupled to and in communication with the processing device 105. The system 100 can further include a compiler 120. The compiler 120 can be any computer program (or set of programs) that translates text written in a computer language (the source language) into another computer language (the target language). The original sequence is usually called the source code and the output called object code. The system 200 can further include a process 125 for implementing shadow versioning to improve data dependence analysis for instruction scheduling, as further discussed herein.

FIG. 2 illustrates pseudo-code 200 of the process of shadow versioning in accordance with exemplary embodiments. In exemplary embodiments, shadow versioning works at the end of high-level optimizations so that it could take full advantage of the analysis result in the high-level optimizer and convey the refined data dependence information to the low-level optimizer. Furthermore, in exemplary embodiments, shadow versioning works one by one on all the loops in the program. In each loop, shadow versioning handle one shadow symbol accessed in that loop a time. In exemplary embodiments, for each shadow symbol accessed in a loop, shadow versioning performs three steps.

In exemplary embodiments, the first step is to utilize the refined data dependence information collected in the high-level optimizer to initialize dependence_matrix. If there are N accesses to a shadow in the loop, dependence_matrix is a N-by-N matrix. The $i^{th}$ row vector represents the dependence between the $i^{th}$ access and all the other accesses in the loop. Each matrix element has two possible values: no_dependence and dependence. All diagonal matrix elements have dependence value. In exemplary embodiments, shadow versioning calls DependenceExists in a two-level loop to examine the dependencies between each pair of accesses to the same shadow symbol. The result is stored in dependence_matrix. After step 1, dependence_matrix contains N row vectors, each of which is a dependence vector for access.

In exemplary embodiments, the second step calls equal to compare the dependence vectors of the accesses to classify them into different sets. All the accesses in the same set have the same dependence vectors, which makes sure that a minimal number of new shadows are generated to disambiguate the accesses. The compiler generates a new shadow symbol for each set and goes through the corresponding accesses in the code to replace the original shadow with the new one.

In exemplary embodiment, the third step sets up the alias relationships between the newly created shadows. If originally there is no dependence between the symbols in set X and the ones in set Y, shadow versioning calls SetNoAlias to mark that the two new shadows don't alias with each other. Otherwise, the new shadows are aliased together by calling SetAlias. If two accesses don't depend on each other, shadow versioning classifies them into two different sets, generates two new shadows for them and mark the new symbols as not aliased. The low-level optimizer benefit from this explicit disambiguation: when it sees two different shadows, it would check the alias relationship between then and finally knows they don't overlap.

Figure 3:
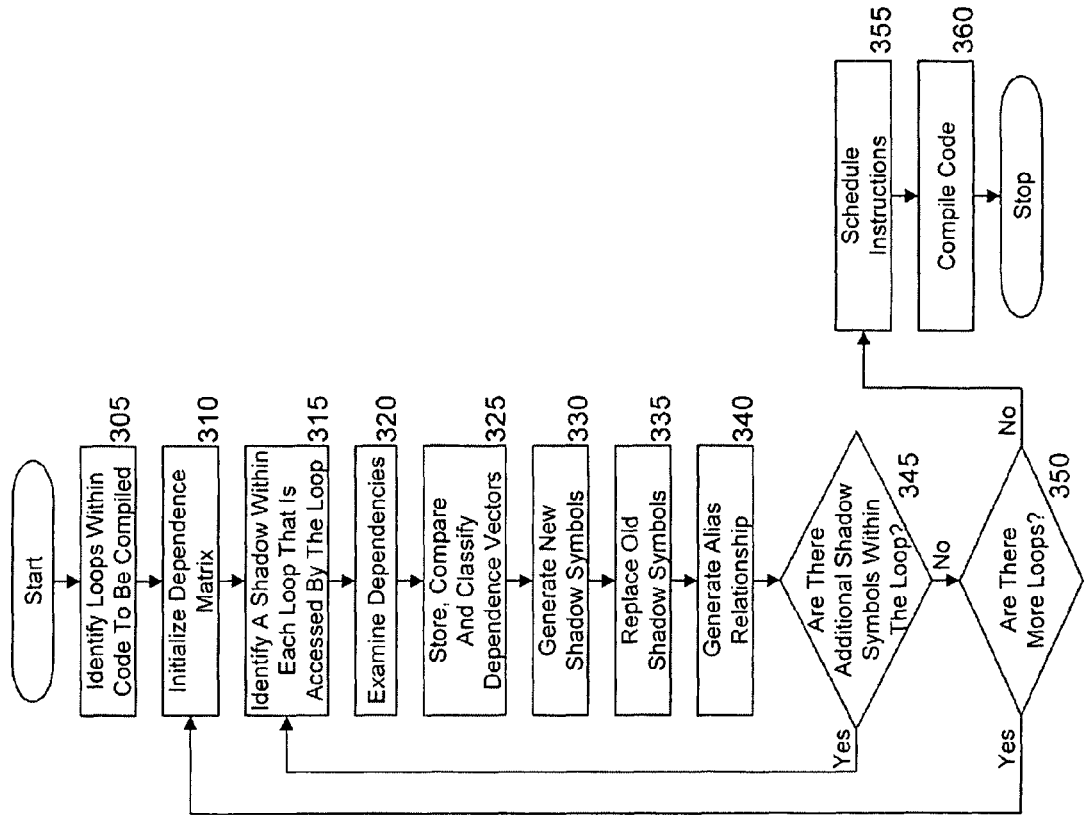
FIG. 3 illustrates a flow chart of a method for implementing shadow versioning to improve data dependence analysis for instruction scheduling.

FIG. 3 illustrates a flow chart of a method 300 for implementing shadow versioning to improve data dependence analysis for instruction scheduling. At step 305, the method 300 identifies loops within the code to be compiled. At step 310, for each loop a dependence matrix is initialized. At step 315, for each loop shadow symbols are identified that are accessed by the loop. At step 320, dependencies are examined. At step 325, dependence vectors are stored, compared and classified. At step 330, new shadow symbols are generated. At step 335 the old shadow symbols are replaced with the new shadow symbols, and at step 340, alias relationships are generated between the newly created shadow symbols. At step 345, if there are additional shadow symbols within the loop, the method continues at step 315. If there are no additional shadow symbols at step 345, then the method 300 determines if there are additional loops at step 350. If there are additional loops at step 350, then the method 300 continues at step 310. If there are no additional loops at step 350, then the method continues to step 355 to schedule instructions and to step 360 to compile the code.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing shadow versioning to improve data dependence analysis for instruction scheduling in compiling code, the method comprising:
   in a processor:
   identifying a plurality of loops within the code;
   for each loop of the plurality of loops:
      identifying an original shadow symbol accessed in the loop;
      initializing a dependence matrix having N rows and N columns for N accesses to the original shadow symbol in the loop, wherein an ith row vector represents a dependence relationship between the ith access to the shadow symbol and all the accesses to the same shadow in the loop;

for each original shadow symbol accessed in the loop, performing:
examining dependencies between an access pair X, Y to the original shadow symbol;
storing dependence vectors for a given access in the dependence matrix as N row vectors, wherein the dependence matrix has two possible values, no-dependence and dependence, and wherein all diagonal matrix elements have the dependence value, and wherein each N row vectors is a dependence vector for access;
comparing the dependence vectors;
classifying the dependence vectors into an X-set and a Y-set based on the access pairs X, Y, wherein accesses in a common set includes common dependence vectors;
generating a new shadow symbol for each set;
replacing the original shadow symbol with the new shadow symbol for a corresponding access in the code, by examining dependencies of the corresponding access in the code, wherein the corresponding access is an element of an N×N dependence matrix and replacing the original shadow symbol with the new shadow symbol that shares a common dependency vector from the dependence matrix;
generating alias relationships between the newly created shadow symbols;
performing instruction scheduling for the code; and
compiling the code.

2. The method as claimed in claim 1 further comprising:
in the processor:
assigning a no-dependence value to a dependence vector having an absence of a dependence between the access pairs X, Y; and
assigning a dependence value to a dependence vector having a dependence between the access pairs X, Y.

3. The method as claimed in claim 2, wherein generating alias relationships between the newly created shadow symbols, comprises:
in the processor:
aliasing two new shadow symbols based on an original dependence of corresponding original symbols in the X-set and the Y-set,
wherein a pair of newly created shadow symbols does not alias each other in response to an absence of a dependence relationship between original symbols in the X-set and the Y-set; and
marking the pair of newly created shadow symbols having the absence of the dependence relationship between original symbols in the X-set and the Y-set, as not aliased.

4. The method as claimed in claim 3 further comprising:
in the processor:
recovering the dependence information to check the alias relationship between the new shadow symbols; and
reordering a set of instructions associated with the new shadow symbols marked as not-aliased.

5. A system for implementing shadow versioning to improve data dependence analysis for instruction scheduling in compiling code, the system comprising:
a processor coupled to a memory;
a process residing in the memory having instructions for:
identifying a plurality of loops within the code;
for each loop of the plurality of loops:
identifying an original shadow symbol accessed in the loop;
initializing a dependence matrix having N rows and N columns for N accesses to the original shadow symbol in the loop, wherein an ith row vector represents a dependence relationship between the ith access to the shadow symbol and all the accesses to the same shadow in the loop;
for each original shadow symbol accessed in the loop, performing:
examining dependencies between an access pair X, Y to the original shadow symbol;
assigning a no-dependence value to a dependence vector having an absence of a dependence between the access pairs X, Y;
assigning a dependence value to a dependence vector having a dependence between the access pairs X, Y;
storing dependence vectors for a given access in the dependence matrix as N row vectors, wherein the dependence matrix has two possible values, no-dependence and dependence, and wherein all diagonal matrix elements have the dependence value, and wherein each N row vectors is a dependence vector for access;
comparing the dependence vectors;
classifying the dependence vectors into an X-set and a Y-set based on the access pairs X, Y, wherein accesses in a common set includes common dependence vectors;
generating a new shadow symbol for each set;
replacing the original shadow symbol with the new shadow symbol for a corresponding access in the code, by examining dependencies of the corresponding access in the code, wherein the corresponding access is an element of an N×N dependence matrix and replacing the original shadow symbol with the new shadow symbol that shares a common dependency vector from the dependence matrix;
aliasing two new shadow symbols based on an original dependence of corresponding original symbols in the X-set and the Y-set,
wherein a pair of newly created shadow symbols does not alias each other in response to an absence of a dependence relationship between original symbols in the X-set and the Y-set;
marking the pair of newly created shadow symbols having the absence of the dependence relationship between original symbols in the X-set and the Y-set, as not aliased;
recovering the dependence information by checking the alias relationship between the new shadow symbols;
reordering a set of instructions associated with the new shadow symbols marked as not-aliased; and
performing instruction scheduling for the code.

* * * * *